(12) United States Patent
Bruno et al.

(10) Patent No.: US 7,581,889 B2
(45) Date of Patent: Sep. 1, 2009

(54) INTEGRAL TANDEM BEARING FOR HIGH SPEED FLEXIBLE SHAFTS

(75) Inventors: Vittorio Bruno, Mississauga (CA); Edward Dusza, Longueuil (CA); Michel Labbe, Montreal (CA); Tibor Urac, Toronto (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 476 days.

(21) Appl. No.: 11/530,088

(22) Filed: Sep. 8, 2006

(65) Prior Publication Data

US 2008/0063333 A1    Mar. 13, 2008

(51) Int. Cl.
   *F16C 19/49* (2006.01)
(52) U.S. Cl. ...................... 384/494; 384/454
(58) Field of Classification Search ......... 384/452–455, 384/462, 465–475, 494, 513, 564; 184/6.11; 415/110
See application file for complete search history.

(56) References Cited

U.S. PATENT DOCUMENTS

| | | | | |
|---|---|---|---|---|
| 2,983,029 A | * | 5/1961 | Perin et al. | 384/564 |
| 2,990,784 A | * | 7/1961 | Wahlmark | 384/494 |
| 3,133,693 A | * | 5/1964 | Matthew | 184/6.11 |
| 3,536,369 A | * | 10/1970 | Ainsworth et al. | 384/494 |
| 3,602,535 A | * | 8/1971 | Behning et al. | 403/118 |
| 4,523,864 A | | 6/1985 | Walter et al. | |
| 4,573,809 A | * | 3/1986 | Jacob | 384/493 |
| 4,683,714 A | * | 8/1987 | Thebert | 184/6.11 |
| 4,900,221 A | | 2/1990 | Ciokajlo et al. | |
| 5,201,844 A | * | 4/1993 | Greenwood et al. | 415/122.1 |
| 6,431,756 B2 | | 8/2002 | Maguire et al. | |
| 2006/0153483 A1 | * | 7/2006 | Bridges et al. | 384/475 |

* cited by examiner

*Primary Examiner*—Thomas R Hannon
(74) *Attorney, Agent, or Firm*—Ogilvy Renault LLP

(57) ABSTRACT

An integral tandem bearing assembly for supporting a main shaft in a gas turbine engine is provided. The tandem bearing assembly comprises two bearing assemblies connected by integrated inner ring.

25 Claims, 3 Drawing Sheets

US 7,581,889 B2

INTEGRAL TANDEM BEARING FOR HIGH SPEED FLEXIBLE SHAFTS

TECHNICAL FIELD

The invention relates generally to gas turbine engines and, more particularly, to gas turbine engines having an improved bearing structure to support high speed flexible shafts.

BACKGROUND OF THE ART

Gas turbine engines such as those used as aircraft turbojets or turbofans typically comprise a rotating fan, compressor and turbines that are mounted to one or more coaxial shafts rotating about a central axis of the engine. One a turbofan engine, a fan and low pressure compressor at the front end of the engine are connected by a long flexible shaft to a low pressure turbine at the rear end of the engine to form a low pressure spool assembly. Often the flexible shaft is supported by three bearings (two bearings at the front fan end, and one at the rear turbine end) to achieve acceptable rotor-dynamic behaviour within the engine. Alternatively, the two bearings at the front fan end may be configured as a robust, single front bearing when thicker shafts are utilized. Arrangement and design of the front bearings impact the overall engine weight, time of engine assembly and cost of the bearings. Accordingly, there is a need to provide an improved bearing assembly for high speed flexible shafts for gas turbine engines.

SUMMARY OF THE INVENTION

It is therefore an object of this invention to provide improved bearings for gas turbine shafts.

In one aspect, the present invention provides an integral tandem bearing assembly for supporting a fan shaft in a gas turbine engine, the tandem bearing assembly comprising a first bearing assembly with an out-of-round outer race; a second bearing assembly with circular races; and a common inner ring assembly at least partially defining inner races for both the first and second bearing assemblies.

In another aspect of the present invention provides an integral tandem bearing assembly for supporting a fan shaft of a gas turbine engine, the tandem bearing assembly comprising a roller bearing assembly: a ball bearing assembly;and a common inner ring assembly at least partially defining inner races for both the roller and ball bearings assemblies.

In yet another aspect of the present invention provides an integral tandem bearing assembly for supporting a fan shaft in a gas turbine engine, the tandem bearing assembly comprising two bearings assemblies; an oil slinger integrated with at least one of the two bearing assemblies; and an inner ring mounted on the flexible high speed shaft for containing the two bearing assemblies.

In still yet another aspect of the present invention provides an integral tandem bearing assembly for supporting a fan shaft of a gas turbine engine, the tandem bearing assembly comprising: a roller bearing assembly; a ball bearing assembly, an outer race of the ball bearing assembly integrally provided as a portion of a housing of the bearing; and an inner ring connecting the inner races of the roller bearing and ball bearing assemblies.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
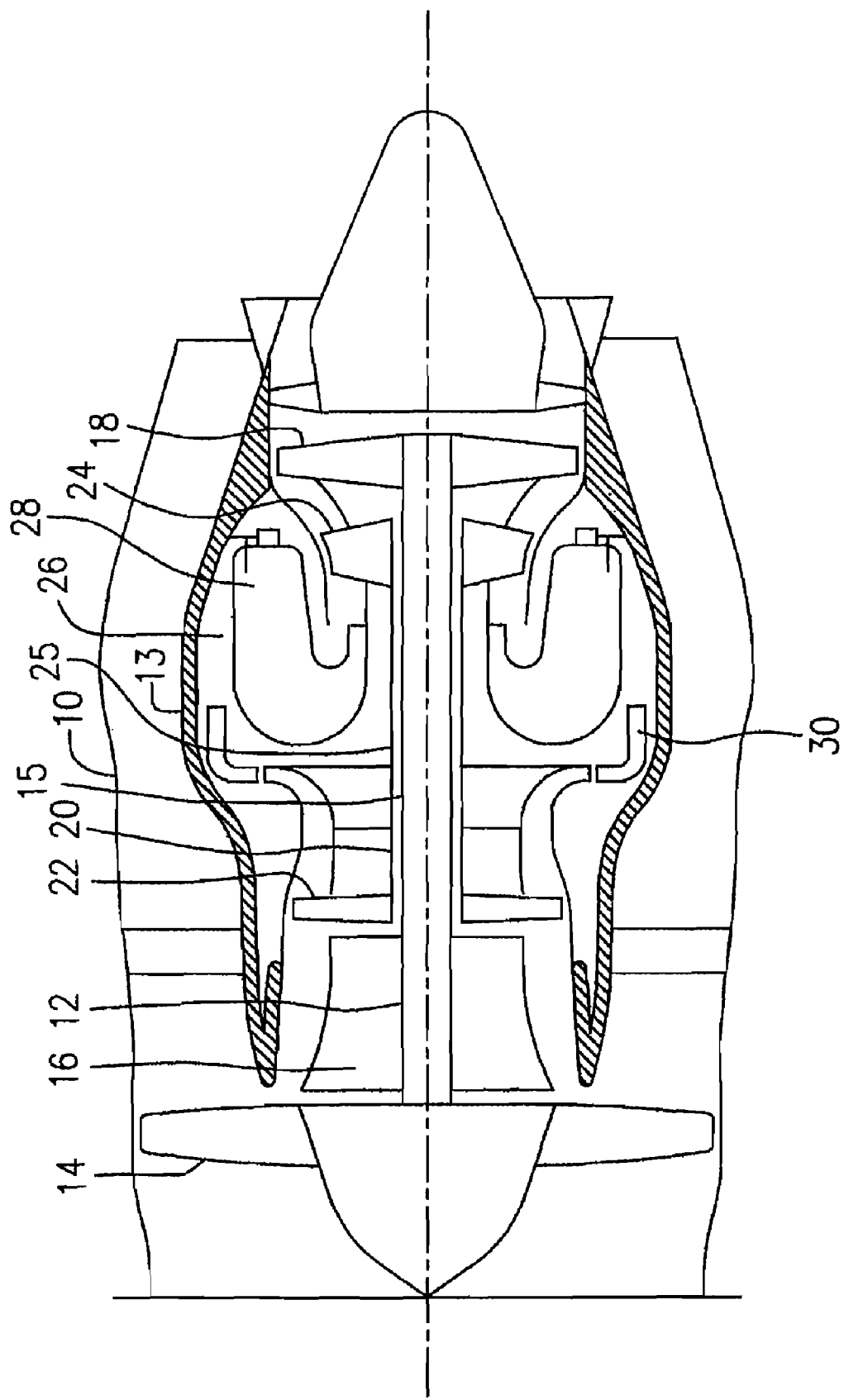
FIG. 1 is schematic cross-sectional view of an exemplary turbofan gas turbine engine, showing an application of the present invention.

Referring to FIG. 1, a turbofan gas turbine engine incorporating an embodiment of the present invention is presented as an example of the application of the present invention, and includes an outer casing 10, a core casing 13, a low pressure spool assembly seen generally at 12 which includes a shaft 15 interconnecting a fan assembly 14, a low pressure compressor 16 and a low pressure turbine assembly 18, and a high pressure spool assembly seen generally at 20 which includes a shaft at 25 interconnecting a high pressure compressor assembly 22 and a high pressure turbine assembly 24. The core easing 13 surrounds the low and high pressure spool assemblies 12 and 20 and defines a main gas path (not indicated) therethrough. In the main gas path there are provided a combustion section 26 having a combustor 28 therein. Pressurized air provided by the high pressure compressor assembly 22 through a diffuser 30 enters the combustion section 26 for combustion taking place in the combustor 28.

In an embodiment of the present invention, a tandem bearing assembly, including two bearings, is located at the front end of a gas turbine engine to support the shaft 15; the low pressure fan 14 and compressor 16 are interconnected by shaft 15. The two bearings which form the integral tandem bearing also incorporate various other functional components, such as the bearing housing, oil slinger and spacer. The integral tandem bearing provides shaft support which is durable and which operates properly under normal and ultimate transient loads. In addition, the design reduces overall engine weight, time of assembly and cost.

Figure 2:
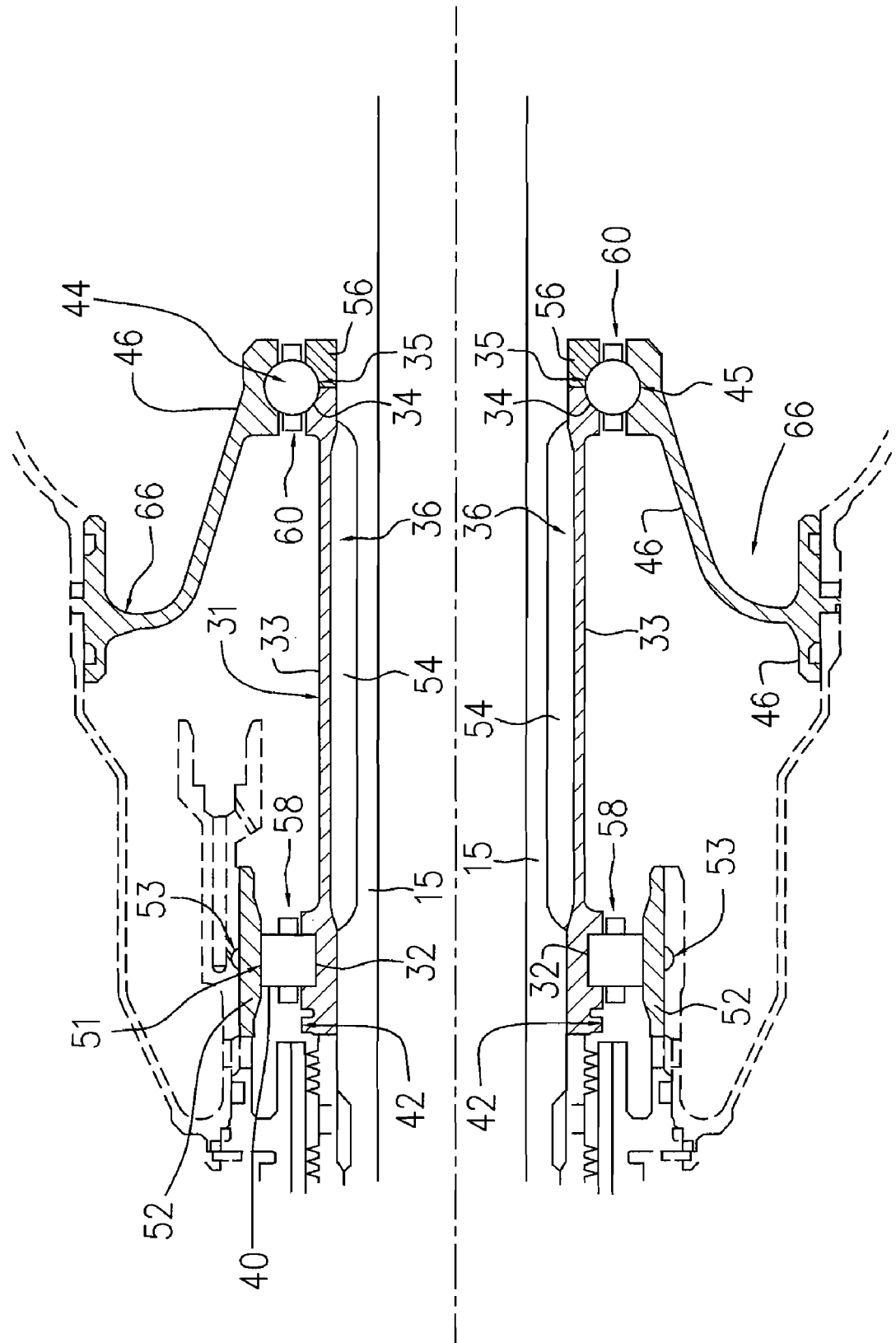
FIG. 2 is cross-sectional view of half of an integral tandem bearing according to one embodiment of the present invention.
Figure 3:
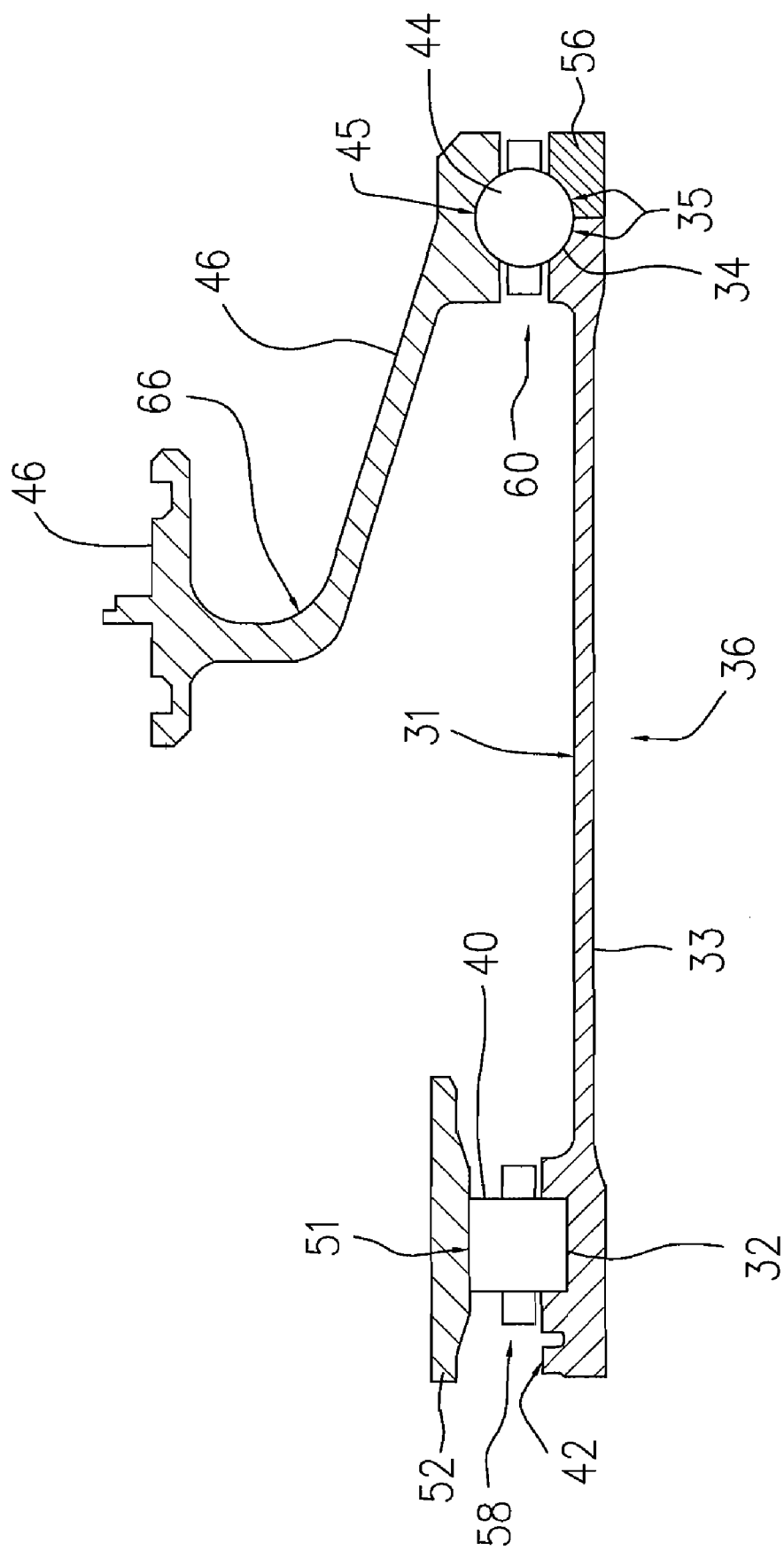
FIG. 3 is a partial cross-section view of an integral tandem bearing according to one embodiment of the present invention.

FIG. 2 shows cross-section of an integral tandem bearing as positioned within a gas turbine engine. FIG. 3 shows a cross-section of an upper portion of an integral tandem bearing. Referring to both FIGS. 2 and 3, the shaft 15 of the low pressure spool assembly 12 is supported proximate to the low pressure compressor 16 by an integral tandem bearing assembly 36 containing a roller bearing assembly 58 and a ball bearing assembly 60. The tandem bearing assembly 36 comprises an integrated inner rings 33 containing inner race 32 of roller bearing and half of the ball bearing inner race 34, a second half of the ball bearing split inner ring 56 containing the another half of the ball bearing inner race, an outer ring 52 of the roller bearing and an outer ring 46 of the ball bearing. The roller bearing inner race 32 and the half of the ball bearing inner race 34 are integrally connected to either end of a spacer 31, thereby forming the inner ring 33 which encompasses the shaft 15. By integrating spacer 31 between the two bearing inner rings the need for a separate spacing part between the bearing assemblies is eliminated, which reduced part count, assembly time, etc. The bearings are axially spaced-apart widely (i.e. much more than a bearing width's apart, and perhaps five bearing widths apart or more), as desired by the gas turbine designer. However, the bearing outer races (51 and 45, respectively) are not integrated with one another, and instead pass bearing loads to different load paths (unindicated) within the gas turbine engine case. There is a space 54 between the inner ring 33 and shaft 15. The roller bearing 58 is damped by an oil damper 53, comprising an oil reservoir behind ring 52, supplied with oil from a suitable source (not shown).

The rollers 40 are contained in between the roller bearing inner race 32 of the inner ring 33 and outer race 51 of the outer ring 52. The outer ring 52 and race 51, when on its own (in free state), has an out-of-round shape, such as an elliptical shape, for pinching the rollers 40 after assembly to ensure sufficient traction wihtout skidding damage to the rollers and races. After assembly in the engine, the roller bearing outer ring 52 becomes almost (i.e. axisymmetrical) to ensure acceptable circumferential distribution of stiffness and damping generated by oil damper 53 and the structure around the outer ring 52. The inner ring 33 provides an integral oil slinger 42, axially forward of the roller bearing assembly 58. The oil slinger 42 protects the adjacent labyrinth seal from being exposed to oil. It also guards the roller bearing 58 from debris injected by the seal.

The balls 44, of the ball bearing assembly 60, are contained by inner race 35 and outer race 45. The inner race 35 is formed by an external half of the split inner ring 56 and the inner race 34 formed by the inner ring 33. The ball bearing outer race ring 46 is integrated with its bearing housing 66, and therefore also serves as a structural component of th engine which links engine case with the ball bearing. The ball bearing outer ring 46 and integral housing 66 may be made of carburized steel or any metal having similar equivalent mechanical and thermal properties. The ball bearing outer race 45 is carburized to provide the required hardness necessary for rolling contacts with the balls 44, while the outer ring/housing structure has appropriate toughness and ductility to sustain ultimate loads.

The above description is meant to be exemplary only, and one skilled in the art will recognize that changes may be made to the embodiments described without department from the scope of the invention disclosed. For example, the present invention can be applicable to a bearing assembly of a gas turbine engine of any type provided that the rotor assembly has a configuration similar to that described, although the use of the integral bearing assembly for high speed flexible shafts at the front end of the fan assembly are described as an example of the present invention. Configurations other than the described for implementing integral tandem bearing inside gas turbine engine integrating various additional components or utilized at varying locations within the engine. Any suitable out-of-round style bearing may be used, for example such as elliptical, 3-point out-of-round, etc. Still other modifications which fail within the scope of the present invention will be apparent to those skilled in the art, in light of a review of this disclosure, and such modifications are intended to fall within the appended claims.

The invention claimed is:

1. An integral tandem bearing assembly for supporting a fan shaft in a gas turbine engine, the tandem bearing assembly comprising:
   a first bearing assembly with an out-of-round outer race;
   a second bearing assembly with circular races; and
   a common inner ring assembly at least partially defining inner races or both the first and second bearing assemblies.

2. The integral tandem bearing of claim 1 wherein the first bearing assembly and the second bearing assembly are axially spaced apart by a spacer integral with the inner ring assembly.

3. The integral tandem bearing of claim 1 wherein said out-of-round outer race of the first bearing is elliptical.

4. The integral tandem bearing of claim 1 wherein the first bearing assembly is a roller bearing assembly.

5. The integral tandem bearing of claim 1 wherein the second bearing assembly is a ball bearing assembly.

6. The integral tandem bearing of claim 1 wherein an inner race of the second bearing assembly is split, wherein half of the split inner race is integrally provided by the inner ring and half of the split inner race is provided by a co-operating ring.

7. The integral tandem bearing of claim 1 wherein an outer race of the second bearing assembly is integrally provided by a structural bearing housing of the second bearing assembly.

8. The integral tandem bearing of claim 1 wherein the first and second bearing assemblies comprise respective outer rings separate from one another.

9. The integral tandem bearing of claim 1 wherein the first bearing assembly further comprises an oil slinger defined by a portion of the inner ring.

10. The integral tandem bearing of claim 9 wherein the oil slinger is forward of the first bearing assembly with respect to the gas turbine engine.

11. A integral tandem bearing assembly for supporting a fan shaft of a gas turbine engine, the tandem bearing assembly comprising:
    a roller bearing assembly having an outer ring;
    a ball bearing assembly having an outer ring separate from the outer ring of the roller bearing assembly; and
    a common inner ring assembly at least partially defining inner races for both the roller and ball bearings assemblies.

12. The integral tandem bearing of claim 11 wherein the roller bearing assembly and the ball bearing assembly are spaced apart by a spacer integral with the inner ring.

13. The integral tandem bearing of claim 11 wherein the outer ring of the roller bearing assembly comprises an out-of-round outer race.

14. The integral tandem bearing of claim 13 wherein the outer race of the roller bearing assembly is elliptical.

15. The integral tandem bearing of claim 11 wherein an inner race of the ball bearing assembly is split, wherein half of the split inner race is integrally provided by the inner ring and half of the split inner race is provided by a co-operating ring.

16. The integral tandem bearing of claim 11 wherein the roller bearing assembly further comprises an integral oil slinger within the inner ring.

17. The integral tandem bearing of claim 16 wherein the oil slinger is located forward of the roller bearing with respect to the gas turbine engine.

18. The integral tandem bearing of claim 11 wherein the outer race of the ball bearing assembly is integrally provided by a structural bearing housing of the ball bearing assembly.

19. An integral tandem bearing assembly for supporting a fan shaft in a gas turbine engine, the tandem bearing assembly comprising:
    two bearing assemblies having respective outer ring separate from one another;
    an oil slinger integrated with at least one of the two bearing assemblies; and
    a common inner ring mounted on the shaft and defining a spacer integral therewith, thereby connecting the two bearing assemblies.

20. The integral tandem bearing of claim 19 wherein two bearing assemblies comprise a roller bearing assembly and a ball bearing assembly.

21. The integral tandem bearing of claim 20 wherein the oil slinger is located forward of the roller bearing assembly with respect to the gas turbine engine.

22. The integral tandem bearing of claim 20 wherein an inner race of the ball bearing assembly is split, wherein half of the split inner race is integrally provided by the inner ring and half of the split inner race is provided by a co-operating ring.

23. The integral tandem bearing of claim 20 wherein the outer ring of the roller bearing assembly comprises an elliptical outer race for pinching the rollers.

24. The integral tandem bearing of claim 20 wherein the inner races of the roller bearing assembly and the ball bearing assembly are integrally provided by the inner ring and wherein the races are spaced apart by a the spacer integral with the inner ring.

25. The integral tandem bearing of claim 20 wherein the outer race of the ball bearing assembly is integrally provided by a structural bearing housing the ball bearing assembly.

* * * * *